United States Patent [19]
Hall et al.

[11] Patent Number: 5,648,868
[45] Date of Patent: Jul. 15, 1997

[54] SECOND GENERATION FLIR NV-81

[75] Inventors: John M. Hall, Alexandria; Richard A. Wright, Stafford; Philip Perconti, Woodbridge, all of Va.

[73] Assignee: The United States of America as represented by the Secretary of the Army, Washington, D.C.

[21] Appl. No.: 440,399

[22] Filed: May 12, 1995

[51] Int. Cl.⁶ .................... G02B 17/00; G02B 5/08; G01J 5/02; H04N 3/08

[52] U.S. Cl. ............... 359/364; 359/365; 359/366; 359/728; 359/729; 359/732; 359/857; 359/858; 250/334; 348/203

[58] Field of Search ................. 359/364, 365, 359/366, 363, 728, 729, 730, 731, 732, 733, 857, 858, 861, 737; 250/334; 358/206

[56] References Cited

U.S. PATENT DOCUMENTS

| | | | |
|---|---|---|---|
| 4,349,843 | 9/1982 | Laakmann et al. | 358/206 |
| 4,569,591 | 2/1986 | Ford et al. | 356/153 |
| 4,733,961 | 3/1988 | Mooney | 356/5 |
| 5,117,306 | 5/1992 | Cohen | 359/565 |
| 5,479,016 | 12/1995 | Curry et al. | 250/334 |
| 5,510,618 | 4/1996 | Blecha et al. | 250/332 |

FOREIGN PATENT DOCUMENTS 319010  12/1989  Japan ................. 359/728

*Primary Examiner*—Paul M. Dzierzynski
*Assistant Examiner*—Mohammad Y. Sikder
*Attorney, Agent, or Firm*—Milton W. Lee; John E. Holford; Alain L. Bashore

[57] ABSTRACT

An optical system is provided for a FLIR mounted in a cylindrical turret which has five folding mirrors, two doubling as scanning mirrors, numerous lenses with aspherical surfaces and different refractive indices, and a rotatable head mirror. Some of the lenses and mirrors being mounted on remote controlled electrically powered focusing or scanning means.

7 Claims, 6 Drawing Sheets

SECOND GENERATION FLIR NV-81

BACKGROUND OF THE INVENTION

1. Field of the Invention

The present invention generally relates to Infrared imaging systems particularly the type used in the far infrared spectral region with wavelengths from 8–14 microns.

2. Description of Prior Art

The Army currently uses as Forward Looking infrared imaging system (FLIR) which is also referred to as a First Generation or GEN I FLIR. A Second Generation or GEN II FLIR has now been proposed in patent application Ser. No. 08/264,280 having U.S. Pat. No. 5,510,618 "SECOND GENERATION FLIR COMMON MODULES", filed 23 Jun. 1994, by Bill A. Blecha et al., in which the field units are kits rather than modules. Modules are used in the kits, but are no longer required to have common designs, as long as the external interfaces of the kit remain unchanged. To test operate each kit requires only a standard power supply, control panel, and display; as found in an Army vehicle, and there will be a such a vehicle or other system for every type of kit. Ground vehicles such as tanks and weapons carriers, which have limited spaces originally designed for GEN I FLIR's, will be equipped with GEN-II FLIR's as described in patent application Ser. No. 08/267,743 having U.S. Pat. No. 5,479,016, "COMPACT SECOND GENERATION FLIR KIT", filed 25 Aug. 1994, by John J. Curry et al. Since the scanning systems now available for GEN II systems have larger apertures and provide greater resolutions, it follows that the optical elements such as lenses and reflectors will be larger also. There is thus a problem presented in how to fit the GEN II kits into the same spaces which hold Gen I modular systems.

SUMMARY OF THE INVENTION

According to the present invention, the image quality of the above system and certain related systems is greatly improved by using newly designed second generation (GEN II) equipment in place of the first generation (GEN I) components, redesigning the lens and the scanning elements to match the performance of the new components, and providing one or more high resolution intermediate focal planes in which to place thermal standards, calibration devices, visual aids and detector enhancement devices.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
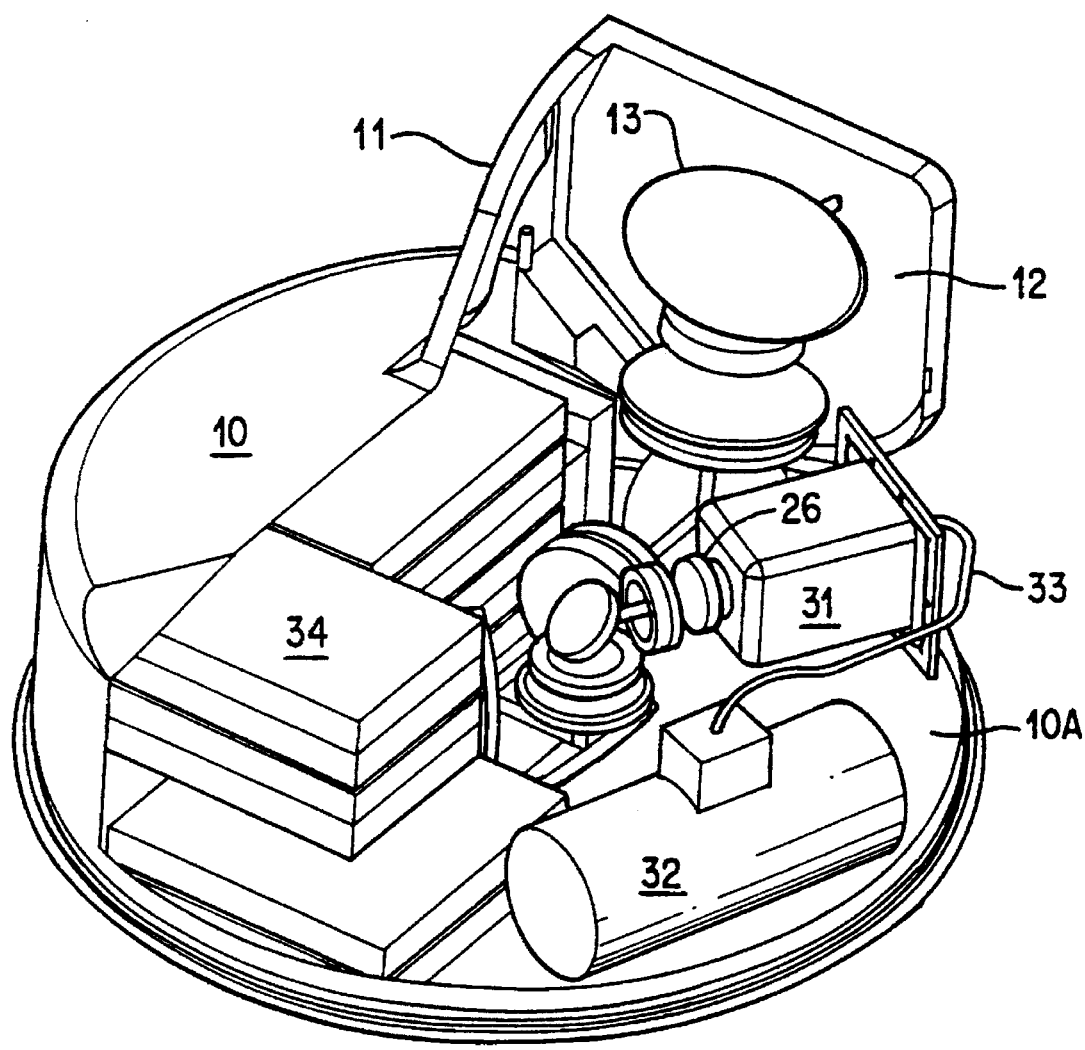
FIG. 1 is a cutaway isometric view of a turret for a GEN II Pilot's Night Vision System (PNVS) as used on the Army's Apache and Commanche helicopters, including a FLIR as proposed by the present invention.

As shown in FIG. 1, the FLIR used in the Pilot Night Vision Systems (PNVS) on the Army's Apache and Commanche helicopters is mounted in a cylindrical turret 10, including a floor 10A, designed to rotate about a horizontal axis in level flight. The turret has a diameter of about 18 inches (45.72 cm) and a height of 6 inches (15.24 cm). It is normally mounted on a support (not shown) projecting from the nose of this helicopter over a targeting FLIR and a daysight. A dormer-like vestibule 11, with a maximum height of 10.25 inches (26 cm), is provided to house the afocal lenses and to define a large afocal aperture 12 in a plane normal to the floor of the turret. The first generation [GEN I] FLIR used a folding mirror after a set of afocal lenses in this housing that pivoted about a point in the plane of this mirror on their common optical axis to sweep out a wide field of view. This system will be discussed further at FIG. 6. The GEN II FLIR uses a rotatable first or head mirror 13 before the afocal lenses; this mirror having an axle parallel to the turret floor and centered on and normal to the optical axis and parallel to the plane of the afocal aperture to obtain a similar field of view. About half of the volume within the turret is filled with electronic circuit boards 34, that process and refine the signals generated by the detector array of the FLIR. A cryogenic cooler 32 occupies about another fairly large fraction of the remaining volume and a dewar 31 that insulates a detector array yet another fairly large fraction. The dewar, known in the U.S. Army as a SADA Ib, has a much improved design over GEN I devices so that the array can be replaced by simply removing the window without disassembling the cold finger. That delicate operation has destroyed many dewars in the past. The array is a two dimensional staggered arrangement supportive of a high order of Time Delay Integration (TDI) and line interlace. The cooler, dewar and electronics are interconnected by harnesses of cables and fluid conduits, like harness 33 in a manner well understood in the art. These components must be positioned within the turret so as not to interfere with the mirrors, lenses and the optical path from the head mirror to an eyepiece 26 at an input window end of the dewar, behind which the detector array is positioned.

Figure 2:
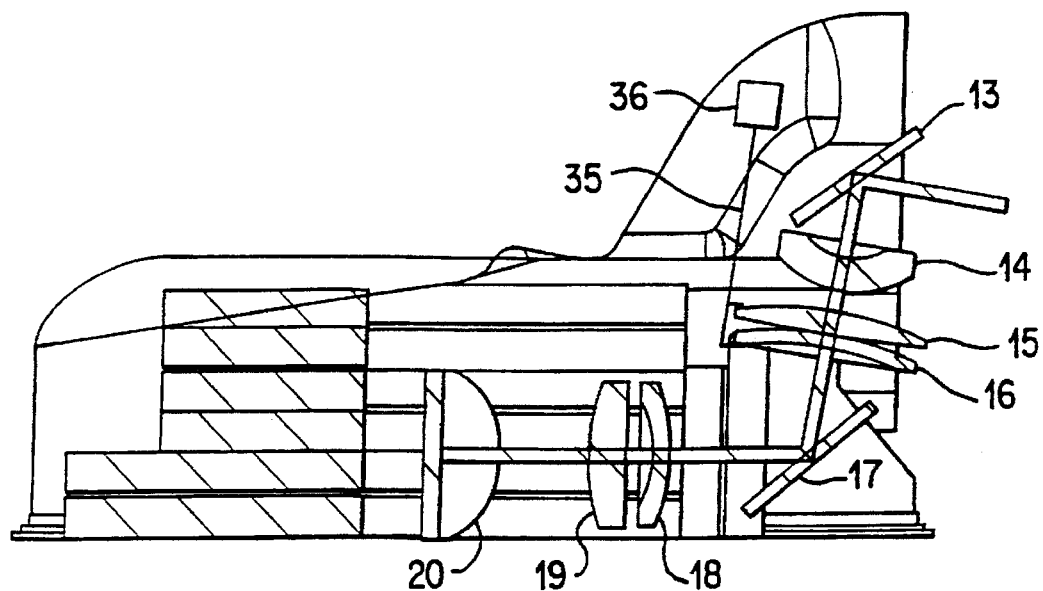
FIG. 2 is a cutaway side view looking into the left side of the turret as viewed in FIG. 1.
Figure 3:
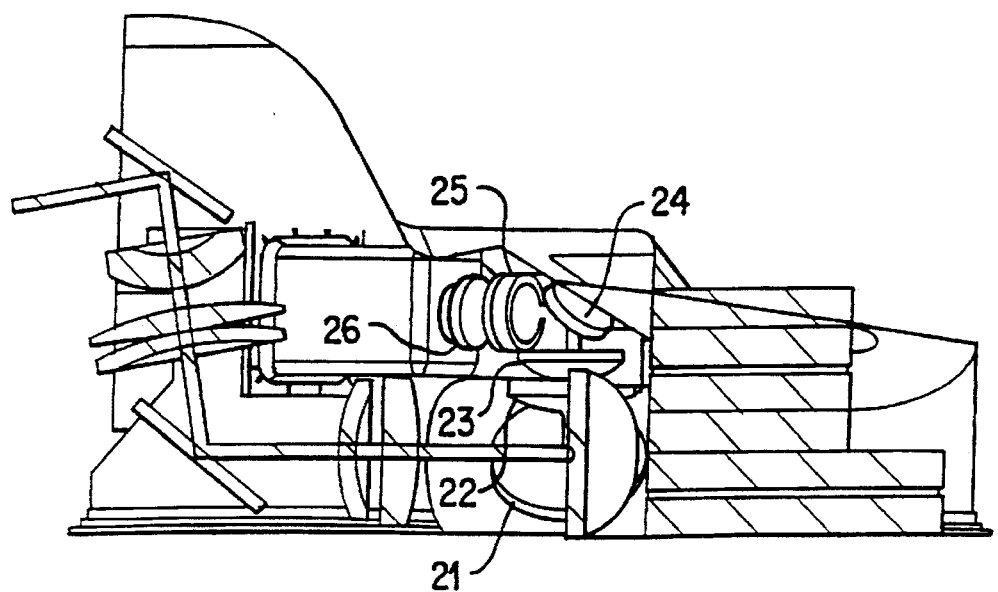
FIG. 3 is a cutaway side view looking into the right side of the turret shown in FIG. 1.

As shown in FIGS. 2 and 3, this FLIR Has first and second internal segments of the optical axis in an input plane through the center of and normal to the head mirror, this input plane also being normal to the floor of the turret. The afocal lenses are centered normally on the first segment and these include a single fixed objective 14, near the head mirror, and a doublet formed of two lenses 15 and 16 each formed from a two different material that with the properties of lens 14, shown in the LENS DATA table to follow, corrects for frequency aberration over the band from 8–14 microns to provide a sharply focussed intermediate image. The front surface of the objective lens 14 and the back surface of lens 15 are aspherically ground to prevent spherical aberration over the same range. The doublet components 15 and 16 are mounted together on a movable focussing frame 35 driven by a remote controlled motor 36, so that the frame travels parallel to the a first segment of the optical axis. This portion of the axis is inclined about 10° to a normal to the floor, so that an axial ray reflected from the center of the first or head mirror strikes the center of a second fixed folding mirror 17, the second mirror being mounted near the floor and slightly further from the plane of the afocal aperture than the head mirror. The objective lens has a nominal field of view (FOV) of 30° which added to a 90° variation of the external input segment of the optical axis by the head mirror, provides an actual 120° FOV for the pilot. The plane of the head mirror initially at 32.5° with vertical, to raise the center of the FOV 45° above horizontal, must then must rotate 45° to 77.5°, to drop center of the FOV 45° below horizontal.

The second mirror is inclined about 40° to the floor to reflect an axial ray parallel to the floor in the same input plane to the center of a third folding mirror 20 to define the second internal segment of the optical axis. A doublet of relay lenses 18 and 19 is normally centered on this second segment. These lenses also are made of different materials and each has an aspherically ground surface to improve their imaging quality. These lenses can be mounted in fixed position, for manual adjustment parallel to the second axis segment or remote adjustment, as per the doublet in the afocal lens. The output rays of this relay doublet are collimated to reduce distortion during a decentering action in the third and fourth segments, to be described.

The third folding mirror is also normal to the floor and tilted about 45° to the second segment of the optical axis to redirect this axis to the right, i.e. toward the dewar 31, still parallel to and near the floor. About two inches to the right of the third mirror a fourth folding mirror 21 has a center that terminates a third segment of the optical axis. This fourth mirror further deflects the optical axis, forming a fourth segment normal to the turret floor extending up to the level of the input axis of the dewar, which input axis is parallel to the turret floor. The third and fourth mirrors are each preferably mounted on the turret through an electrical vibrator. A first of these vibrators rocks its mirror about an axis preferably normal to the turret floor to decenter or scan the optical axis over a range approximately equal to the width of the image at a line image rate so as to generate, for example, a standard 60 image fields per second. The second decentering normal to the first a small fraction of the amplitude of the first at an interlace rate so as to generate, for example, one of the standard 30, 20, 15, etc. image frames rates per second.

A fifth folding mirror 24 redirects the optical axis at the upper end of the fourth axial segment along the dewar input axis to define a final fifth internal segment ending at a photosensor array in the dewar. A first image reducing doublet lens set is normally centered on the fourth axial segment, the reducing doublet comprising lenses 22 and 23. This lens set focuses an the image down to the size of the small fifth folding mirror 24. A single element reducing lens 25 is mounted in the turret normally centered on the fifth axial segment to reduce the reflected image from mirror 24 to the aperture size of the input aperture of the dewar eyepiece 26.

Figure 4:
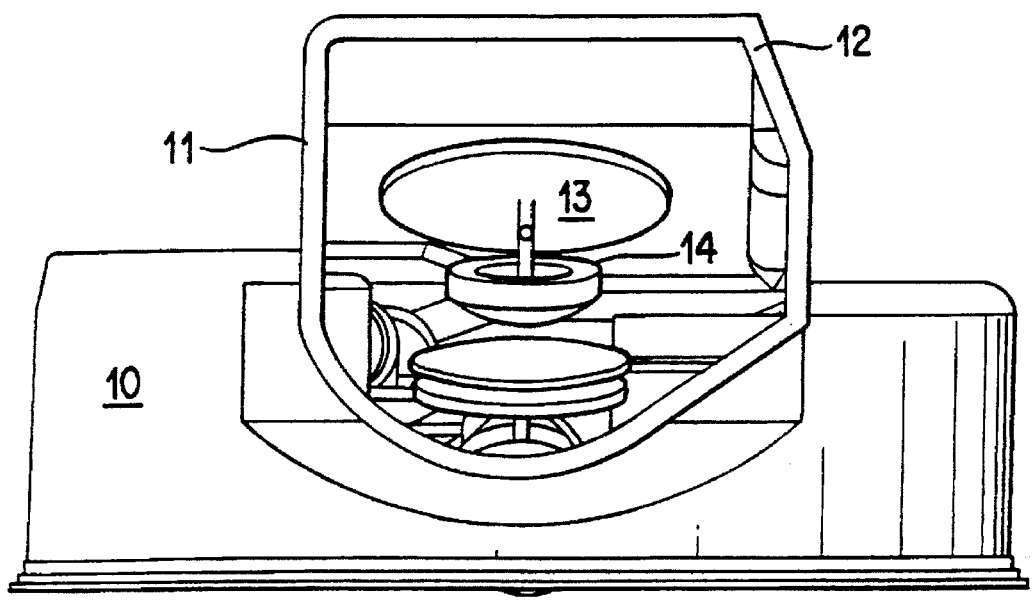
FIG. 4 is a view looking into the objective window side of the turret shown in FIG. 1, showing the true shape of that window.

FIG. 4 shows a frontal view looking normally into the input aperture. The mirror 13 is rotated by a motor mounted in the turret about an axis in the plane of the figure and parallel to the floor of the turret. The head mirror can be manually controlled by the pilot or by a helmet mounted display with a remote control unit that detects movements of the pilot's head to automatically control similar azimuth movements of the turret and elevation movements of the head mirror. This arrangement field of view enables the pilot to quickly locate obstacles or targets, almost as if he were looking at visible targets through the windshield of his aircraft. The vastly improved resolution of the GEN II system greatly simplifies identification of such targets.

Figure 5:
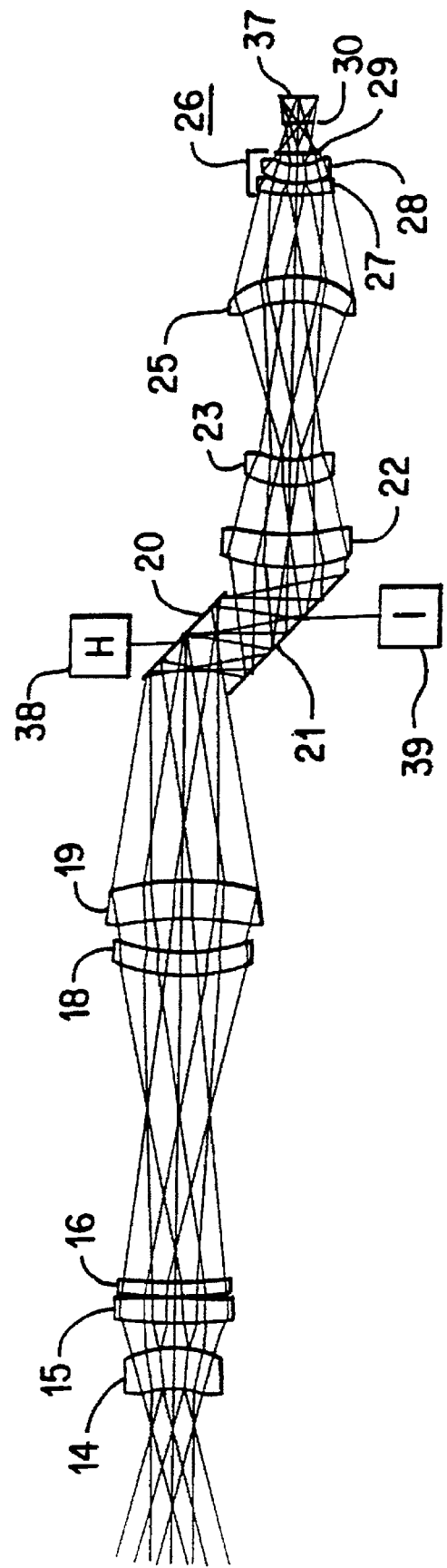
FIG. 5 shows an optical ray tracing through the optical elements of the system, with the exception of the fixed folding mirrors.

FIG. 5 shows a ray tracing of far infrared light through the optical elements of the system. The eyepiece 26 houses a doublet of lenses 27 and 28, again made of different materials and each having one aspherically ground surface. The final refractive elements 29 and 30 represent the uniformly thin parallel walls of the vacuum bottle in the dewar which have only a minimal, if any, effect on the final image appearing or the sensor array 37. The previous FLIR required only one scanning mirror, however, whereas the present FLIR uses a sensor array that requires a vertical interlace scan between fields and a wider horizontal line scan to employ time-delay-integration (TID) both of which greatly improve visible image quality. The first, second and fifth mirrors are not shown in FIG. 5 because they have minimal effect on image quality, their folding function greatly reduces the maximum dimension of the space by the optical elements allowing them to fit in the relatively small turret. All mirrors and lenses are mounted to the nearest convenient wall surface of the turret. The vibrators 38 and 39, preferably mounted on the floor of the turret, which support mirrors 20 and 21 are also shown in this figure. There are also two convenient high resolution focal planes at which planar thermal references can be mounted near the edge of the image and detected by overscan. Filters and similar devices can likewise be employed at these planes.

Figure 6:
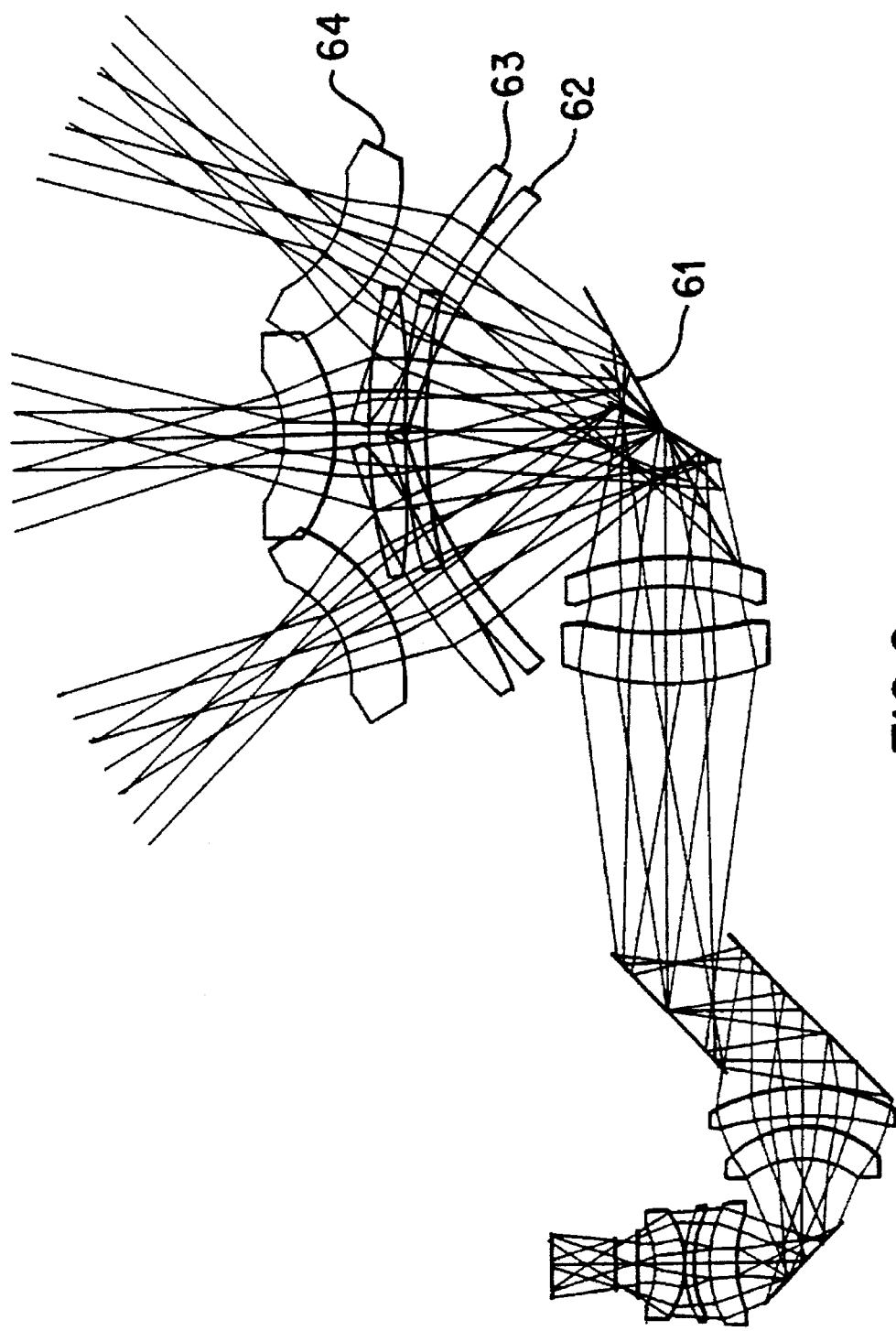
FIG. 6 shows an optical ray tracing through a prior art GEN I FLIR system for use in the same turret as above.

FIG. 6 shows a first generation FLIR system from the prior art which the present system is designed to replace. This FLIR uses only four mirrors, one of which vibrates to provide horizontal line scan. Another mirror 61 is placed at the hinge of a lens boom wherein a set of afocal lenses 62, 63 and 64 swing through an angle of 45° to provide a wider field of view. The number of lens elements is the same as that in the second generation system described herein, but the lenses are of a much poorer quality. Because of this and the limited detector array used, the image quality of this GEN I imager is very poor compared to GEN II systems currently under development.

Figure 7:
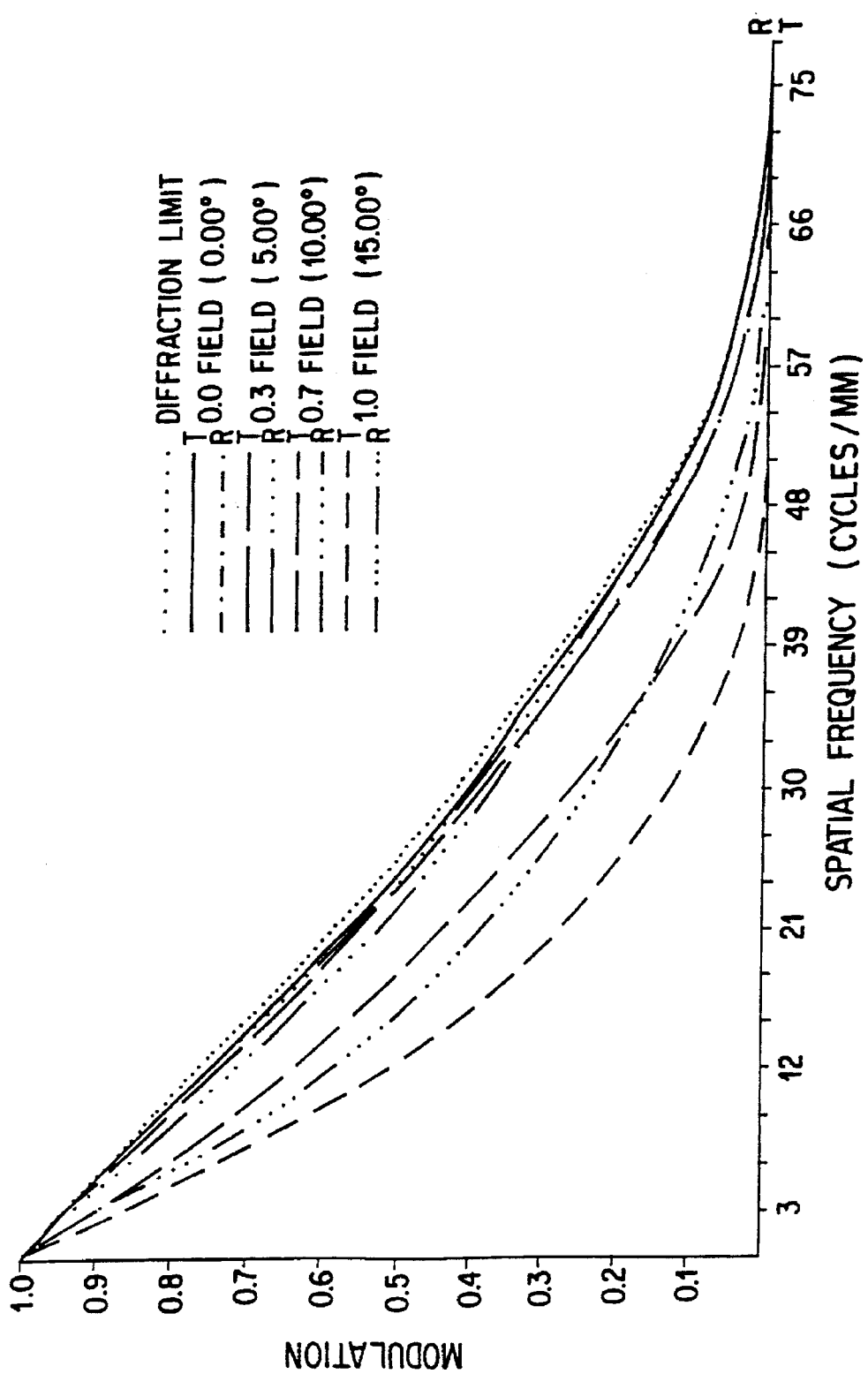
FIG. 7 a graph of the Modulation Transfer Functions [MTF] for the system in FIGS. 1–5 above.

FIG. 7 shows a graph of the Modulation Transfer Function (MTF) of the GEN II system, best shown in FIG. 5, for various fields of view. The curves show that for the on-axis, zero degree fields of view, the system has diffraction limited resolving power. Resolution drops toward the edges of the field of view, but is still adequate at one cycle per milliradian (equivalent to about 32.3 cycles/mm on the MTF graph.

The following table fully prescribes the structure of the various elements. Simple folding mirrors are not included, but vibrating mirrors are included because of their decentering effects. The lenses take maximum advantage of aspheric curvatures. A few pages of explanations follow the table to define aspheric, decentering and other variables and constants associated with the optical system.

| | LENS DATA NV-81 Interlaced B-Kit | | | | | |
|---|---|---|---|---|---|---|
| Elem. | Radium of Curvature | | Axial Distance to next | | | |
| No. | Front | Back | Surf. | Aperture | Lens | |
| | | | | Front | Back | Glass |
| Obj. | Infinite | | Infinite | | | |
| | | | | 6.5764 | | |
| | | | 1.3019 | | | |
| | | | | 1.0644 | | |
| 13 | | | 1.3360 | | | |
| 14 | A(1) | −2.1266 cx | 0.6746 0.4451 | 1,0935 | 1.5649 | Ge |

-continued

LENS DATA NV-81 Interlaced B-Kit

| Elem. No. | Radius of Curvature Front | Radius of Curvature Back | Axial Distance to next Surf. | Aperture Front | Aperture Back | Lens Glass |
|---|---|---|---|---|---|---|
| Obj. | Infinite | | Infinite | | | |
| 15 | 8.0202 cx | A(2) | 0.4441 0.0122 | 1.9607 | 1.9450 | Ge |
| 16 | 7.5640 cx | 6.1347 cc | 0.2388 0.5963 | 1.9156 | 1.8447 | ZnSe |
| | | | 1.4553 | 1.7072 | | |
| | | | 1.8843 | 1.3271 | | |
| | | | 1.2939 | 1.6212 | | |
| 18 | 3.4601 cx | A(3) | 0.3580 0.0838 | 2.2917 | 2.2060 | ZnSe |
| 19 | A(4) | −4.86321 cx | 0.6459 1.8994 | 2.3642 | 2.5423 | Ge |
| | | | 2.3496 Decenter (1) | 1.8754 | | |
| 20 | Infinite | | 1.8000 Decenter (2) | 1.9279 | | Refl. |
| 21 | Infinite | | 1.1500 | 2.8913 | | Refr. |
| 22 | 3.0760 cx | A(5) | 0.5916 0.8370 | 2.1516 | 1.9137 | Ge |
| 23 | 1.7851 cx | A(6) | 0.4225 1.2109 | 1.4661 | 1.1487 | Ge |
| | | | 1.5700 | 1.0355 | | |
| 25 | A(7) | −1.7686 cx | 0.4110 1.4046 | 1.8817 | 2.1605 | Ge |
| 27 | A(8) | 1.7641 cc | 0.1866 0.0050 | 1.3419 | 1.2296 | ZeSe |
| 28 | 0.9863 cx | A(9) | 0.3432 0.1156 | 1.1959 | 0.8963 | Ge |
| | | | 0.0994 | 0.8883 | | |
| 29 | Infinite | Infinite | 0.0400 0.0915 | 0.7256 | 0.7128 | Ge |
| | Aperture Stop | | 0.4000 | 0.5135 | | |
| 30 | Infinite | Infinite | 0.0200 0.3880 | 0.5595 | 0.5615 | Ge |
| 37 | | Image Distance = | 0.0095 | 0.7337 | | |
| Img. | | Infinite | | 0.7493 | | |

NOTES—
Positive radius indicates the center of curvature is to the right.
Negative radius indicates the center of curvature is to the left.
Thickness is axial distance to next surface.
Image diameter shown above is a paraxial value, not a traced ray value.

ASPHERIC CONSTANTS $$Z = \frac{(CURV)Y^2}{1 + (1 - (1+K)(CURV)^2 Y^2)^{0.5}} + (A)Y^4 + (B)Y^6 + (C)Y^8 + (D)Y^{10}$$

| ASPHERIC | CURV | K | A |
|---|---|---|---|
| A(1) | −0.70609907 | 0.000000 | 1.24776E−02 |
| A(2) | −0.04207195 | 0.000000 | 5.03005E−03 |
| A(3) | 0.33507978 | 0.000000 | −3.55499E−03 |
| A(4) | −0.10312943 | 0.000000 | −1.13875E−04 |
| A(5) | 0.21599490 | 0.000000 | 7.19223E−03 |
| A(6) | 0.78035840 | 0.000000 | −3.45076E−02 |
| A(7) | −0.46676563 | 0.000000 | −2.12720E−02 |
| A(8) | 0.43069775 | 0.000000 | 4.36498E−03 |
| A(9) | 1.03859296 | 0.000000 | −3.17354E−02 |

| ASPHERIC | B | C | D |
|---|---|---|---|
| A(1) | 1.16436E−02 | −1.11260E−02 | 6.63904E−03 |
| A(2) | −6.92662E−04 | 7.20244E−05 | −3.37346E−06 |
| A(3) | 2.55722E−04 | −3.06367E−04 | 2.08388E−05 |
| A(4) | −1.34100E−04 | 1.26618E−05 | −3.07939E−05 |
| A(5) | 6.16391E−04 | −1.00468E−03 | 6.13454E−04 |
| A(6) | 4.79500E−02 | −1.18422E−01 | 1.89442E−01 |
| A(7) | −2.82191E−04 | −6.74529E−04 | −6.39203E−04 |
| A(8) | 3.93746E−02 | 0.00000E+00 | 0.00000E+00 |
| A(9) | 1.71770E−01 | 4.71970E−01 | −2.41421E+00 |

DECENTERING CONSTANTS

| DECENT | X | Y | Z |
|---|---|---|---|
| D(01) | 0.0000 | 0.0000 | 0.0000 |
| D(02) | 0.0000 | 0.0000 | 0.0000 |

| | ALPHA | BETA | GAMMA | |
|---|---|---|---|---|
| D(01) | 45.0000 | 0.0000 | 0.0000 | (BEND) |
| D(02) | −45.0000 | 0.0000 | 0.0000 | (BEND) |

A decenter defines a new coordinate system (displaced and/or rotated) in which subsequent surfaces are defined. Surfaces following a decenter are aligned on the local mechanical axis (z-axis) of the new coordinate system. The new mechanical axis remains in use until changed by another decenter. The order in which displacements and tilts are applied on a given surface is specified using different decenter types and these generate new coordinate systems; those used here are explained below. Alpha, beta, and gamma are in degrees.

DECENTERING CONSTANT KEY:
TYPE, TRAILING CODE, ORDER OF APPLICATION.

| DECENTER | DISPLACE (X, Y, Z) TILT (ALPHA, BETA, GAMMA) REFRACT AT SURFACE THICKNESS TO NEXT SURFACE |
|---|---|
| DECENTER AND BEND | BEND DECENTER (X, Y, Z, α, β, γ) REFLECT AT SURFACE BEND(α, β, γ) THICKNESS TO NEXT SURFACE |

REFERENCE WAVELENGTH = 10000.0 NM
SPECTRAL REGION = 8000.0–11500.0 NM

This is a decentered system. If elements with power are decentered or tilted, the first order properties are probably inadequate in describing the system characteristics.

INFINITE CONJUGATES

| EFL = | 1.2292 |
|---|---|
| BFL = | 0.0100 |

-continued

| INFINITE CONJUGATES | |
| --- | --- |
| FFL = | −0.2889 |
| F/NO = | 1.6390 |
| IMAGE DIST = | 0.095 |
| OAL = | 22.9964 |
| PARAXIAL | |
| IMAGE HT = | 0.3294 |
| SEMI-FIELD | |
| ANGLE | 15.0000 |
| ENTR PUPIL | |
| DIAMETER = | 0.7500 |
| DISTANCE = | 1.5928 |
| EXIT PUPIL | |
| DIAMETER = | 0.4900 |
| DISTANCE = | −0.7930 |

NOTES-
FFL is measured from the first surface.
BFL is measured from the last surface.

Having thus described my invention, what we claim as new and desire to secure by Letters Patent is as follows:

1. A GEN II FLIR (with TDI and interlace) for a Pilot's Night Vision System having a closed cylindrical housing with a plane circular floor and a dormer-like vestibule apertured to define a optical input window in an input plane normal to said floor as used in the U.S. Army's Apache and Commanche type helicopter, which housing encloses and supports; a dewar, the optical axis of said FLIR between said input window and said dewar, and a series of far infrared (mirror and lens) elements along said optical axis (and a sensor array at the output end of said optical axis); said far infrared elements, comprising:

five mirrors mounted in a series within said housing along said optical axis to fold the said optical axis into five segments that sequentially traverse the length width and depth of said housing and thereby occupy less than half of the volume of said housing, the first mirror and segment being adjacent said input window;

a first set of objective lens elements mounted on said optical axis between the first and second mirrors of said series;

a second set of relay lens elements mounted between the second and third mirrors of said series;

a third set of first image reducing lens elements mounted between the fourth and fifth mirrors of said series;

a separate image reducing lens and a fourth set of eyepiece lens elements mounted between said fifth mirror and said dewar;

a detector element comprising a two dimensional staggered TDI array of far-infrared sensors mounted at the end of the fifth segment of said optical axis in said dewar:

a first remotely actuated motorized mounting means attached to said housing to rotate said first mirror of said mirrors about a first axis parallel to said input plane and said floor, so as to simulate head movements of the user;

a second motorized mounting means attached to said housing adjusted to angularly vibrate said third mirror about a second axis at the field scan frequency of said FLIR with sufficient amplitude to accomodate the TDI properties of said array; and a third motorized mounting means attached to said housing adjusted to angularly vibrate said fourth mirror about a third axis at a fraction of the frequency and amplitude of said first mounting means to interlace at least two successive fields, said second and third axes being normal to each other with one of said second and third axes being parallel to said floor.

2. A GEN II FLIR according to claim 1, wherein:

at least one of said objective lenses in said first set is made of a different material than a second of said lenses in said first set, said first and second lenses thereby having substantially different indices of refraction for far infrared light that compensate for frequency aberration of an image when viewed by a band of frequencies.

3. A .SEN II FLIR according to claim 1, wherein:

at least one of said objective lenses has an aspherically ground surface to reduce spherical aberration in the objective set.

4. A GEN II FLIR according to claim 1, wherein:

said objective lenses include remote controlled mounting means to move at least part of said first set parallel to said optical axis to thereby focus the system on targets from about fifty feet from the FLIR to infinity.

5. A GEN II FLIR according to claim 1, wherein:

at least one lens in each of said first, second, and fourth sets is made of a different material than another lens within the same set, the lenses within each set thereby having substantially different indices of refraction for far infrared light that compensate for frequency aberration of an image when viewed by a band of frequencies.

6. A.GEN II FLIR according to claim 1, wherein:

two lenses within each of said sets, each have an aspherically ground surface, to reduce spherical aberration within all of said sets.

7. A GEN II FLIR according to claim 1, wherein:

said relay lenses include remote controlled motorized mounting means to move at least part of said second set parallel to said optical axis to initially focus the FLIR and to refocus the system in response to changes in image resolution caused by movement of lenses set in said first lens set, or unintentional shifting of any other mirror or lens element along said optical axis.

* * * * *